Sept. 27, 1966  W. B. VAN ORMAN  3,274,648
SEAL RING FOR SCREW TYPE EXTRUDERS
Filed June 29, 1965

INVENTOR
WILLIAM B. VAN ORMAN
BY
Sandoe, Neill, Schottler & Wilkstrom
ATTORNEYS.

United States Patent Office 3,274,648
Patented Sept. 27, 1966

---

3,274,648
SEAL RING FOR SCREW TYPE EXTRUDERS
William B. Van Orman, Clearwater Beach, Fla., assignor to General Cable Corporation, New York, N.Y., a corporation of New Jersey
Filed June 29, 1965, Ser. No. 468,046
15 Claims. (Cl. 18—13)

This invention relates to extruding apparatus for covering wire with plastic or rubber insulation.

A problem encountered in the operation of screw-type extrusion equipment is the prevention of leakage of the covering material at the junction of the crosshead and the extruder barrel which contains the screw.

Crossheads are connected with the barrels of extruders by means of a circle of bolts extending through flanges of the crosshead and the end of the extruder barrel, and the tension of these bolts is transmitted through the flanges to a strainer plate containing a screen pack located between the end of the barrel and the inner end of the crosshead.

In order to assure that the bolt tension will be transmitted to clamp the strainer plate tightly against the crosshead, a gap or clearance must be provided between the flanges. To maintain contact with substantially uniform pressure around the entire periphery of the connection, all bolts must be uniformly tight. If they are not, the crosshead cants and this produces a localized clearance or region of low contact pressure between the crosshead and the strainer plate, with resulting leakage when subjected to the high pressure of the material being extruded.

Other means have been tried for connecting a crosshead with an extruder barrel; for example, a clamping ring with an inside face that includes two confronting concave surfaces for co-operation with complementary surfaces on flanges on the crosshead and extruder barrel. Such clamping means must be very accurately made; but they often distort after a period of time as the result of repeated loading and heating, and the complexity of the shapes involved, particularly that of the clamping ring, causes the distortion to be non-uniform. This results in head cant and leakage.

The cause of the leakage is well known and it follows that if head cant can be prevented, leakage can also be prevented provided that the clamping pressure between the faces is higher than the pressure of the extruded liquid. The simplest way of preventing head cant is to provide a broad surface of contact between the flanges of the crosshead and extruder barrel and to use configurations that are not susceptible to warping or distortion.

However, simply providing a broad contact surface introduces other problems. When the force exerted by the head bolts or clamping ring is distributed over a large contact area, it is insufficient to produce a contact pressure equal to that of the internal pressure exerted by the plastic in the extruder barrel. It is impractical to increase head bolt size, or the number of bolts, or to increase the size of the clamping ring sufficiently to obtain a clamping pressure between the flange faces equal to the extrusion pressure.

Such expedients as undercutting the contact surfaces to reduce contact area and thereby increase contact pressure requires that the components be very accurately machined. The width of the remaining contact area becomes smaller and more easily damaged in service and the component configurations are less stable mechanically and distort and deform more readily with repeated heating and cooling under load.

It is an object of this invention to provide an improved construction for connecting a crosshead with an extruder barrel with broad surface areas of contact and with a seal which is independent of the area of contact of flanges that join the crosshead to the extruder barrel. The invention can be used with a ring of clamping bolts, with clamping rings, or other expedients for connecting the crosshead to the end of the extruder barrel. It is one object of the invention to provide sealing means that can be used with conventional extruder apparatus for preventing leakage at the connection of the crosshead and the barrel.

Another object is to provide apparatus for preventing leakage without requiring accurate and uniform pressure around the circumference of the connection between the crosshead and the barrel.

Other objects, features and advantages of the invention will appear or be pointed out as the description proceeds.

In the drawing, forming a part hereof, in which like reference characters indicate corresponding parts in all the views.

Figure 1:
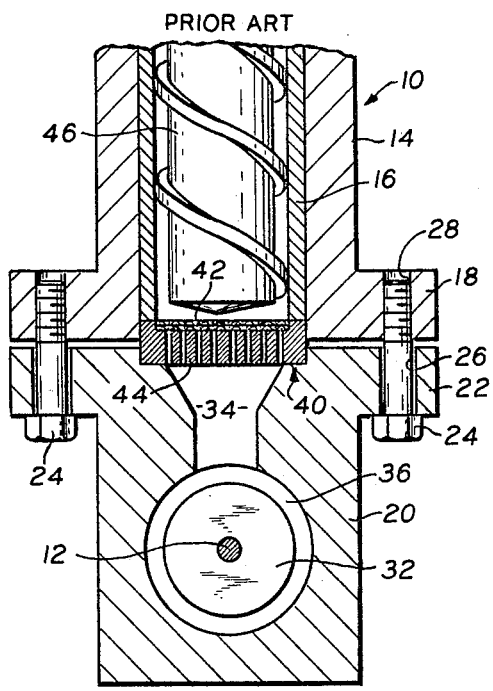
FIGURE 1 is a sectional view showing a conventional connection of a crosshead to an extruder barrel in apparatus of the prior art.

FIGURE 1 shows extrusion apparatus 10 for extruding a layer of electrical insulation on a metal conductor 12, such as a copper wire. The apparatus includes an extruder barrel 14 having a liner 16, which will be considered a part of the barrel. There is a flange 18 on the end of the barrel 14, and of integral construction therewith.

A crosshead 20 has a flange 22 connected to the flange 18 by a circle of bolts 24. Each of the bolts 24 extends through an opening 26 in the flange 22 and threads into openings 28 in the flanges 18. Longer bolts with nuts can be used, if desired.

An extrusion die 32 is associated with the crosshead 20. Since this extrusion die 32 is conventional, no detailed illustration of it is necessary. It is sufficient to understand that the plastic is forced downward through a passage 34 in the crosshead 20 and through an annular clearance 36 of the die 32; and that the cross section of the annular clearance 36 converges and decreases in radial extent until it reaches the outside surface of the conductor 12 on which the plastic material is deposited as a sleeve. The conductor 12 travels with continuous motion through the die 32 and plastic is forced through the clearance of the die continuously at a rate which is correlated with the speed of the conductor 12, in accordance with conventional practice.

There is a strainer plate 40 across the end of the chamber of the extruder barrel 14. This strainer plate is clamped between the barrel 14 and the crosshead 20. In the construction illustrated, the strainer plate consists of a perforated plate 44 which supports a screen pack 42. The purpose of the screen pack is to prevent any extraneous material in the plastic from passing into the crosshead passage 34 and also to break up and thoroughly mix the material from the barrel 14 as it enters the passage 34 of the crosshead.

A conveyor screw 46, in the chamber of the extruder barrel 14, feeds the plastic material downwardly and forces it through the strainer plate 40 under high pressure. This pressure depends upon the viscosity of the material and upon the clearances in the extrusion die, and also on a number of other factors.

Figure 2:
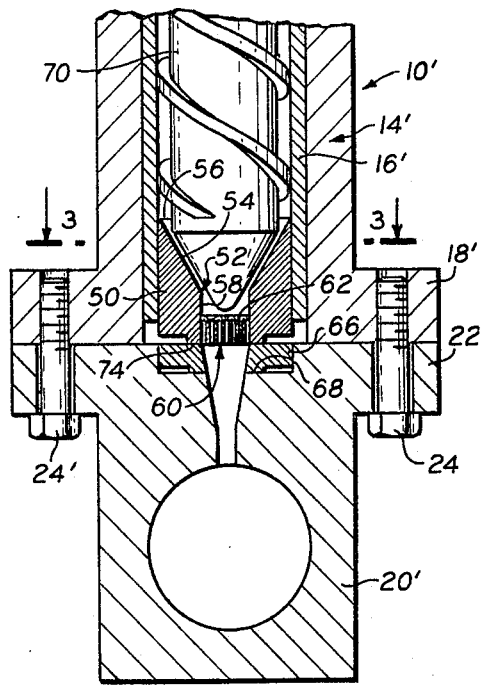
FIGURE 2 is a view similar to FIGURE 1 but showing the construction of this invention.
Figure 3:
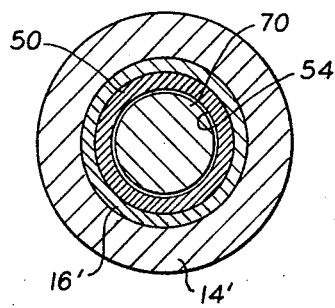
FIGURE 3 is a sectional view taken on the line 3—3 of FIGURE 2.

FIGURE 2 shows extrusion apparatus 10' in which corresponding parts are indicated by the same reference characters as in FIGURE 1, but with a prime appended.

The apparatus shown in FIGURE 2 has a seal ring 50 which fits into the end of the extruder barrel 14'. The outside surface of the seal ring 50 is preferably cylindrical and of substantially the same diameter as the inside diameter of the liner 16', but the seal ring 50 has a running fit in the extruder barrel so that it can move axially with respect to the barrel. There is a passage 52 through the seal ring 50 and this passage is coaxial with the cylindrical outside surface of the seal ring 50. The passage 52 has a flaring entrance formed by a frusto-conical surface 54 which meets the outside cylindrical surface of the ring 50 along a top edge 56, which is substantially a feather edge but has a short radius so as to provide strength against bending. The ring 50 is preferably made of metal, and preferably steel. It can be hardened, but somewhat better results have been obtained in practice by using steel which is annealed.

At its lower end, the frusto-conical surface 54 merges with a substantially cylindrical wall 58 which may extend to the lower end of the seal ring 50, but in the construction illustrated in FIGURE 2 there is a perforated partition 60 across the lower part of the cylindrical wall 58 and this partition is an integral part of the seal ring 50 and serves as a strainer plate for supporting a screen pack 62. The seal ring 50 is held against downward displacement by contact with a spacer 66 inserted in a socket 68 in the top face of a crosshead 20'. If desired, the perforated partition can be part of the spacer 66, or a separate plate fitted between the bottom face of the seal ring 50 and the top face of spacer 66.

There is a conveyor screw 70 in the chamber of the extruder barrel 14'. This conveyor screw 70 serves the same purpose as the screw 46 of FIGURE 1 in advancing the heated plastic insulation downwardly through the extruder barrel 14', but the lower end of the screw 70 of FIGURE 2 is of a shape to extend into the frusto-conical portion of the passage 52 and because of its correlation with the seal ring 50, the tapered end of the conveyor screw 70 serves some additional purposes.

In the construction illustrated in FIGURE 2, the end portion of the conveyor screw 70 is frusto-conical with the same angle of taper as the surface 54 of the passage 52; but this tapered end face of the screw 70 extends beyond the lower end of the frusto-conical surface 54 and into the substantially cylindrical portion 58 of the passage 52.

With the conventional screw 46 (FIGURE 1) and strainer plate 40, maximum flow of plastic occurs through the strainer plate holes adjacent to the space between the outside diameter and the root diameter of the screw helix and this flow diminishes progressively toward the center of the strainer plate. With certain plastic and rubber materials, and under certain unpredictable conditions, flow through the central group of strainer plate holes stops. This results in localized stagnation and leads to premature vulcanization of rubber materials and decomposition of plastic materials that are trapped in the stagnant region.

By forming a conical end, such as shown on the conveyor screw 70 of FIGURE 2, and a substantially conforming inside surface 54 on the seal ring 50, no such region of stagnation occurs. The inclusion of the seal ring provides for improved working of the plastic materials and results in the materials being in a fully masticated condition when they reach the strainer plate 40.

When the tapered end portion of the screw 70 rotates with respect to the surface 54 of the seal ring 50, a shearing action occurs in the plastic material to facilitate mastication and mixing. In the description of the insulating material herein, the term "plastic" is used in a broad sense to include rubber, though the invention has particularly advantageous operation with certain rubber insulations which require better mixing and more uniform flow than do other thermal plastic materials requiring less compounding than rubber insulations.

An additional advantage of the seal ring 50 is that it provides a simple means for controlling resistance to flow which, in turn, has marked influence on the performance of the conveyor screw as a mixing and masticating device. With too little resistance to flow, mastication and mixing is incomplete. With too much resistance to flow, the output of the apparatus is reduced.

With this invention, resistance to flow may be varied by using a different diameter for the passage 52 through which the plastic covering material flows through the seal ring 50, or by changing the clearance between the tapered end of the screw 70 and the frusto-conical surface 54 of the seal ring 50. This may be done by putting in seal rings having different size passages 52; or the clearance between the tapered end of the conveyor screw 70 and the passage through the seal ring 50 may be changed by using a different spacer 66 which has less or more axial height.

The seal ring 50 has an annular bottom face 74 that contacts with the top face of the spacer 66. This annular bottom face 74 has a radial extent substantially less than the radius of the seal ring 50 so as to reduce its area of contact and thereby increase its pressure against the spacer 66. The projected area of the frusto-conical surface 54 which is subject to downward pressure by plastic in the extruder barrel 14' is substantially greater than the area of the annular bottom face 74. Since the bottom face 74 is held against the spacer 66 by the pressure of the plastic above the seal ring 50, it will be apparent that this pressure of the bottom face 74 against the spacer 66 is proportional to the pressure of the plastic and is always greater than the pressure of the plastic because of the reduced area of the bottom face 74. Thus leakage of plastic between the bottom face 74 of the ring 50 and the top surface of the spacer 66 is prevented.

The plastic pressure against the frustoconical surface 54 has a substantial radial component and theoretically some expansion of the seal ring 50 results; but with the seal ring construction shown in FIGURE 2, prevention of leakage between the outside diameter of the seal ring and the inside diameter of barrel depends primarily upon the resistance to flow resulting from a tight fit between the outside diameter of the seal ring and the inside diameter of the barrel as well as the length of the seal ring, and for this reason the construction of FIGURE 2 is referred to as the nonexpandable type. This is the simplest, most durable type of ring, and will work well in combination with new barrels or barrels that have not worn oversize or out-of-round. For preferred proportions, the length of the ring is from one to three times the diameter. The included angle of the frusto-conical surface 54, FIGURE 2, is at least 60° and preferably 90° or more. In the construction shown in FIGURE 2, the included angle of the surface 54 is approximately 90°, and with a metal ring 50, this is considered a "non-expandable" type of seal ring. This description means that the seal ring does not rely upon expansion to effect a seal.

It should be observed that in the construction shown in FIGURE 2, the flanges 18' and 22' are clamped in contact with one another by screws 24'; and because of the large areas of contact between these flanges 18' and 22', the extruder barrel 14' and the crosshead 20' are maintained in alignment, but the pressure between the contacting surfaces of the flanges 18' and 22' need not be as high as the pressure of the fluid in the extruder since the seal ring 50 prevents leakage from the extruder independently of the pressure with which the flanges 18' and 22' contact with one another.

Figure 4:
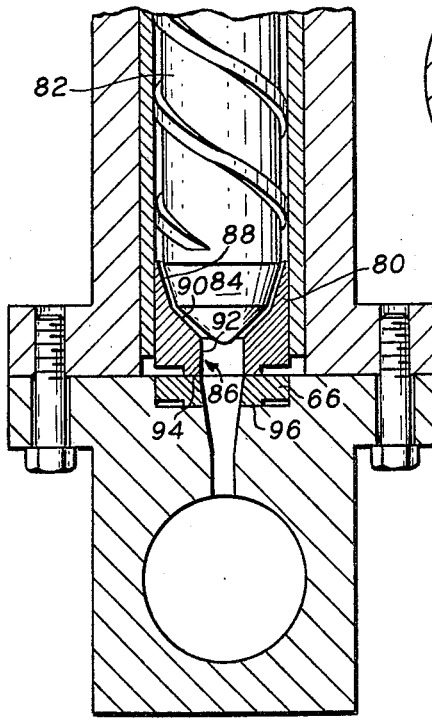
FIGURE 4 is a view similar to FIGURE 2 but illustrating a modified form of the invention.

FIGURE 4 shows a construction similar to FIGURE 2 except that a seal ring 80 is used in place of the ring 50 of FIGURE 2, and a conveyor screw 82 has an end portion 84 which is of a different shape from that used in FIGURE 2 because of the different shape of the passage through the seal ring 80. Another difference is that the construction shown in FIGURE 4 has no strainer plate. Where conditions make the strainer plate unnecessary, all modifications of the invention can be used without the strainer plate.

The seal ring 80 has a passage 86 including an upper frusto-conical surface 88; lower frusto-conical surface 90; and a substantially cylindrical surface 92. The included angle of the surface 90 is substanially 90°, thus the angle of taper is approximately 45°. The included angle of the upper surface 88 is substantially less than that of the surface 90 and is preferably between 10 and 30 degrees. Surfaces 54 (FIGURE 2) and 88 (FIGURE 4) have a length between 50% and 150% of ring diameter, but are not limited to these proportions.

The seal ring 50 is of a type referred to as an "expandable" seal ring. This description means that the upper portion of the ring around at least a part of the surface 88 is thin enough to be expanded radially by the radial pressure of the plastic in the extruder barrel. This has the advantage that the ring 80 does not have to be made so accurately as if it were one of the nonexpandable types of seal ring. The upper part of the ring 80 when expanded by pressure of the plastic fits the cylindrical chamber so closely that it prevents leakage between the ring 80 and the confronting wall of the cylindrical chamber of the extruder barrel.

The end portion 84 of the screw 82 may be shaped so that its tapered surfaces have the same angle of taper as the surfaces 88 and 90 of the ring 80. However, in the construction shown in FIGURE 4, the end portion 84, where it confronts the surface 88, has a surface of the same angle of taper as the surface 88, but where it confronts the surface 90, the angle of taper of the end portion 84 is greater than that of the surface 90 so that the clearance between the end portion 84 and the surface 90 becomes progressively greater toward the bottom of the ring 80. The end portion 84 is shown extending for a short distance into the part of the passage 86 having the substantially cylindrical surface 92.

The seal ring 80 has an annular bottom face 94 similar to the bottom face 74 of FIGURE 2. The spacer 66 has a bottom face 96 which is of less radial extent than the spacer and which is located under the bottom face 94, the construction being the same as that shown in FIGURE 2. Like the FIGURE 2 construction, the spacer 66 in FIGURE 4 is removable and replaceable with spacers of different height in order to change the clearance between the end portion 88 of the screw 82 and the frusto-conical surfaces 88 and 90 of the rim 80.

The preferred embodiments of the invention have been illustrated and described, but changes and modifications can be made and some features can be used in different combinations without departing from the invention as defined in the claims.

What is claimed is:

1. In plastic extrusion apparatus, the combination including an extruder barrel having a cylindrical chamber therein, a cross-head connected with the extruder barrel and extending across the end of the chamber, the cross-head having a passage therein into which plastic material is discharged from the barrel, a seal ring that fits into the end portions of the barrel and that is axially movable in the barrel into contact with the cross-head, around the cross-head passage, the ring having a passage therethrough in line with the cross-head passage, at least a part of the length of the passage through the ring diverging in a direction away from the cross-head, and the area of contact of the ring with the cross-head being no greater than the projection of the area of the diverging part of the passage on a plane normal to the axis of the barrel, and an extruder screw in the barrel for advancing the plastic along the barrel and into the cross-head passage.

2. The plastic extrusion apparatus described in claim 1 characterized by the extruder screw having a tapered end portion that projects into the diverging part of the passage through the ring.

3. The plastic extrusion apparatus described in claim 2 characterized by the dameter of the tapered portion of the screw at each location along the axial length of the ring being spaced from the confronting surface of the passage through the ring to provide a clearance between the tapered portion of the screw and the diverging part of the passage for flow of plastic through the passage in the ring.

4. The plastic extrusion apparatus described in claim 3 characterized by a strainer plate in the passage through which the plastic travels beyond the end of the screw, said strainer plate being close to the tapered end of the screw.

5. The plastic extrusion apparatus described in claim 3 characterized by a spacer in the cross-head and comprising the part of the cross-head with which the ring contacts, said spacer being removable from the cross-head for replacement by another spacer of different height to hold the ring in a different axial position with respect to the screw and thereby change the clearance between the ring and the tapered portion of the screw.

6. The plastic extrusion apparatus described in claim 5 characterized by a socket in the face of the cross-head confronting the end of the extruder cylinder chamber, the spacer fitting into and being held in place by said socket, a raised annular surface on the bottom of the spacer of less radial extent than the bottom of the spacer but surrounding the cross-head passage on all sides, the end face of the ring that contacts with the spacer also having a raised annular surface similar to that under the spacer and in contact with the area of the spacer that is located above the raised annular surface on the bottom of the spacer.

7. The plastic extrusion apparatus described in claim 5 characterized by the divergence of the passage through the ring extending through substantially the full diameter of the ring at the end of the ring most remote from the cross-head so that the diverging surface meets the outside cylindrical surface of the ring along a relatively sharp upper edge of the ring.

8. The plastic extrusion apparatus described in claim 7 characterized by the diverging passage having a frusto-conical surface with the angle of divergence from the axis of the passage being greater than about 60° and the axial extent of the ring being between about one to three times the outside diameter of the ring.

9. The plastic extrusion apparatus described in claim 7 characterized by the divergence of the passage through the ring being different at different portions of its axial length and having a wider included angle of divergence along a portion that is nearer to the cross-head than along the portion that meets the outside wall of the ring.

10. The plastic extrusion apparatus described in claim 9 characterized by the portion of the passage through the ring with the lesser angle of divergence having a frusto-conical surface and an angle of divergence with respect to the axis of the passage between about 10 and 30°, and the axial extent of the frusto-conical surface having the lesser angle of divergence being between about 50 and 150% of the diameter of the ring.

11. The plastic extrusion apparatus described in claim 9 characterized by the tapered end of the screw having a surface confronting a portion of the ring passage that has a lesser angle of divergance and the tapered end of the screw being equally spaced from the surface having said lesser angle of divergence throughout the length of that surface, and the screw having another surface confronting the portion of the ring passage having the greater angle of divergence but said other surface of the screw having a different taper than the confronting surface of the ring passage, said taper increasing the clearance of the screw from the sides of the ring passage in a direction toward the cross-head end of the ring passage.

12. The plastic extrusion apparatus described in claim 11 characterized by the ring and the spacer being held in axial alignment with one another by a flange on the end of the barrel and a second flange on the cross-head in contact with the flange on the barrel and a ring of screws holding the flanges clamped together.

13. The plastic extrusion apparatus described in claim 1 characterized by only a portion of the length of the passage through the ring diverging, and the other portion of the length of the passage through the ring being substantially cylindrical and in axial alignment with the passage in the cross-head.

14. Apparatus for extruding a plastic insulation over a conductor including in combination a cross-head for connection with an extrusion die through which the conductor travels, an extruder barrel enclosing a chamber for thermal plastic material that has to be extruded, the cross-head having an inlet passage in communication with the barrel, a seal ring in the barrel movable axially into contact with the cross-head around an inlet passage of the cross-head, means for holding the extruder barrel and the cross-head in alignment with one another including confronting surfaces different from the areas of contact of the ring with the cross-head and of greater area than the area of contact of the ring with the cross-head, said confronting surfaces being radially spaced outward from the area of contact of the ring with the cross-head.

15. The apparatus described in claim 14 characterized by the aligning surfaces being the confronting faces of flanges, one of the flanges on an end of the extruder barrel and the other of the flanges being on an end of the cross-head, and a detachable fastening means holding the flanges together.

References Cited by the Examiner
UNITED STATES PATENTS

| | | | |
|---|---|---|---|
| 1,939,041 | 12/1933 | Cherry | 18—13 |
| 2,185,701 | 2/1940 | Boyle | 18—13 |
| 2,573,440 | 10/1951 | Henning | 18—13 |
| 2,794,213 | 6/1957 | Davis | 18—13 |

WILLIAM J. STEPHENSON, *Primary Examiner.*